Aug. 8, 1933.  G. L. MATHER  1,921,473
MANUFACTURE OF PNEUMATIC TIRE CASINGS
Original Filed Feb. 2, 1928  2 Sheets-Sheet 1

INVENTOR.
GEORGE L. MATHER
BY
ATTORNEY.

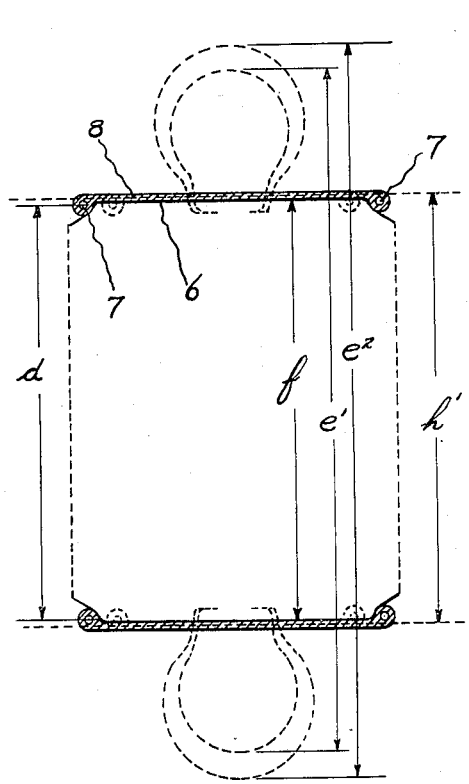
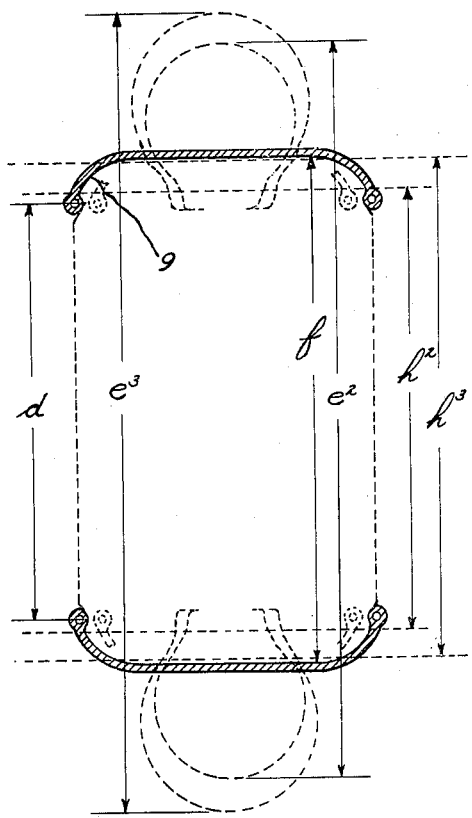

Patented Aug. 8, 1933

1,921,473

UNITED STATES PATENT OFFICE 1,921,473

MANUFACTURE OF PNEUMATIC TIRE CASINGS

George L. Mather, Milwaukee, Wis., assignor to The Fisk Rubber Company, Chicopee Falls, Mass., a Corporation of Massachusetts Application February 2, 1928. Serial No. 251,343
Renewed December 6, 1932

6 Claims. (Cl. 154—10)

This invention relates to a method useful in building cord tires and to a structure useful in practicing the method.

According to my invention I proceed as follows:

When assembling the materials for a tire carcass, I locate the bead edges substantially the same as if the rest of the carcass structure were to be assembled in flat annular form according to known practice, except that my bead edges are closer together. That is to say, the bead portion assembly is not a feature of my invention, but the assembly and shaping of the flexible portions of the carcass material between the bead portions are features of my invention. I shape the carcass material adjacent the bead edges as arched portions and as if the whole cross-section were to be of arch form from edge to edge. These arched portions extend from each bead portion toward the other a sufficient distance to locate the greater part of the carcass material in a substantially larger annulus than that in which the beads lie, and the greater part of the carcass material, thus located, is shaped in flat form out of the central portion of my carcass material as it is assembled. This particular procedure and its purpose will be clearer from an explanation of the accompanying drawings in which, Fig. 1 shows a cross-section of a tire building drum on which my invention may be practiced, a finished tire carcass section being shown on the drum;

Fig. 2 is a diagrammatic view showing certain features of the prior art practice with respect to flat drum building;

Fig. 3 is a view similar to Fig. 2, but showing in contrast thereto the desired practice made available by my invention;

Fig. 4 is a diagrammatic view of a strip of cord fabric illustrating what is termed the angle of cut; and Fig. 5 is a diagrammatic view of the crown portion of a tire carcass illustrating what is termed the finish angle of the cords.

Figure 1:
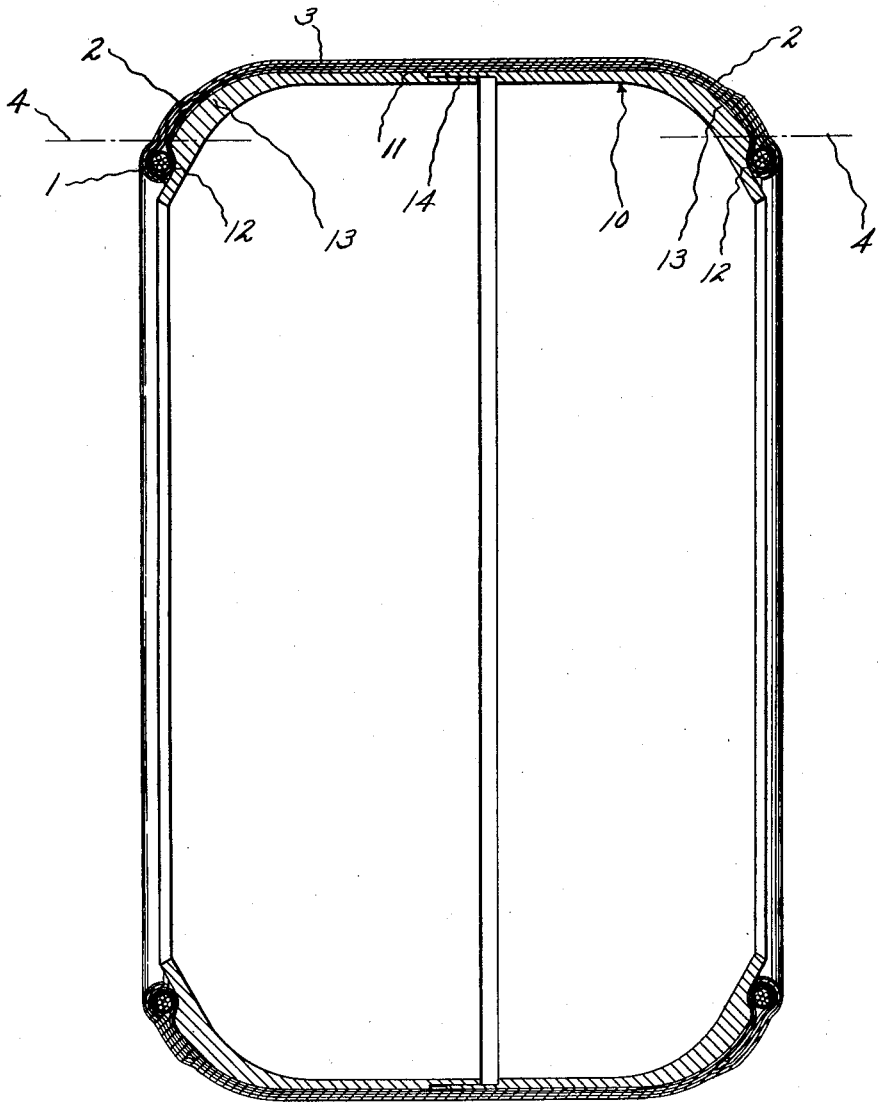

My tire former is generally indicated at 10 and comprises a flat raised crown portion 11, bead receiving portions 12 and arched portions 13 connecting the portions 11 and 12. The former is preferably made adjustable as to width as at 14. The bead edges or portions of the tire carcass are shown at 1 and they are characterized as usual by being the relatively inflexible and immovable anchor portions of the carcass. The arch-shaped portions adjacent the beads are shown at 2 and are characterized by their relative flexibility as forming a part at least of the sidewall portions of the carcass. The central portion is shown at 3 and this is characterized by its flexibility as forming the tread and any part of the sidewall structure not included in portions 2. My method is characterized by the relative manner in which the portions 2 and 3 are formed.

The purpose of building the carcass in this particular form will be described in detail. Such detail will bring out additional and preferred features of the invention both in regard to the method and the building former.

In the building of cord tires of large cross-section, it has been found that flat building methods for assembling of the carcass make difficulties because when the tire carcass is built with a flat cross section throughout its flexible portions and then shaped according to known methods, the extreme movement which the carcass portions need to undergo, in order to pass from their annular but flat cross-sectional form to their doubly curved tire form, causes an objectionable degree of rearrangement of the individual cords so that the ultimate tire is quite frequently not what is desired in balanced tire formation. This fault is increased when the tire parts are originally assembled by the flat building method and the tire shaped by expansion is not only of large cross-section but of relatively small rim or bead diameter. This latter requirement in many balloon tires causes an extreme curvature of the tire walls in their final form, which increases the necessary movements of the carcass material when shaped from the flat annulus up to tire form. As a result it has been the usual practice to build only the relatively small sizes of tires by the flat building method, using for the larger tires the old core method involving a core on which the carcass materials are assembled and at the same time shaped by spinning operations to approximately the form of the finished tire.

According to my method I assemble the carcass materials preferably on my peculiarly shaped former so that the arch portions 2 incline upwardly from the bead portions far enough to space the flat or central portion of the carcass 3 outwardly from the bead diameter enough so that this flat portion can be readily shaped as a unit by any of the known means used in the flat building methods and without trouble due to excessive movements of the parts. It should be appreciated that this trouble is avoided by the fact that in building the larger sized tires, to which my invention is particularly directed, each ply, or pair of plies, may be only slightly expanded as it is placed on the drum, and the method of expanding the whole carcass as a unit is used only for that range which experience has proved to be practicable and suitable for the adjustment of the assembled carcass material. In this respect the central portion of my relatively large carcass is shaped with all the advantages that smaller tires are shaped with. This central portion has its edges integral with the arch-shaped portions, which act somewhat as if they were the bead edges of my tire in the shaping operation because they do not need to move enough to cause any difficulties, having already been shaped in the assembling operation in anticipation of the requirement that the expansion shaping step shall be confined primarily to a limited portion of the flexible parts of the large carcass.

Due to the fact that the arch-shaped portions when assembled are given a double curvature approximating the double curvature of the tire formation, it is not necessary in the final shaping for them to move much more than would have been the case had the whole carcass been assembled and shaped on a core. Due to the fact that the side portions do not need to be moved much with relation to the central portion, they serve as a "buffer" between the flat central portion which is given the extreme shaping operation and the bead edges which anchor the carcass assembly for the shaping operation.

I have found by actual experiment that I can by my method build a tire with much greater facility on my former than the same tire of approximately equal quality can be built on a tire shaped core; and I have found that the large sized tire built according to my invention has better quality than the same size built on any of the so-called flat building formers now generally in use, other things being approximately equal.

Following this experimentation, tires have actually been built according to my method in large quantity on my particular building former, without encountering the difficulties above mentioned, and put into use with entirely satisfactory results. I believe this to be due in part at least to the following procedure which is considered of advantage in the practice of my method: in laying up the carcass laminations I build two or more plies of cord fabric with the angle of the cords in one ply reversed with respect to the angle of the cords in an adjacent ply, each lamination being in the form of a flat strip of predetermined length or in the form of a flat annular band formed by joining the ends of the strip. A so-prepared lamination whether in the strip or annular form is termed a "pocket" and the pocket diameter is the diameter of the pocket when in unstretched annular form. The diameter of this pocket is slightly less than the diameter of the flat portion 11 of my building former. I stretch the pocket either in strip or annular form onto the building former so that its central portion contracts tightly against the flat portion of the former and due to the smaller diameter of the pocket its edges or skirts fall down slightly toward the arch surface portions 13 of the former. The latter can be truly shaped to the former by simple rolling or stitching operations and, as a plurality of these pockets are assembled on the former, the beads can be tied in at the edges and the carcass shaped in unit form as shown in Fig. 1. The carcass material may, if desired, be wound on the building former a single ply at a time, the "pocket diameter" being the diameter of the circle of which the unstretched ply length is the circumference.

While I prefer the arch-shaped portions 2 curved transversely of the former, as shown, it is apparent that the curvature thereof may be increased, or flattened out, without departing from the scope of my invention so long as the partially shaped skirts formed between the flat central portion and the bead edges of the tire are of an extent sufficient to enable me to start the unit shaping operation of the flat central portion far enough beyond the beads to avoid causing such an internal movement of the cords in taking ultimate tire shape that the resulting difficulties will outweigh the advantages to be gained by flat building methods for tires of large cross-section.

In carrying out my method I prefer the assembly at the bead edges to be made in the relative position shown in the drawings. This bead arrangement, briefly stated, is for the purpose of preventing an excessive rolling action of the beads or a "pivoting" of the carcass about the bead wires during the expansion of the tire to shape, and aims to partially substitute therefor a hinging action approximately at the points 4. The exact building position desirable for the beads up to the points 4 differs for different types of bead construction and in applying my invention it is not necessary to depart from the best practice in this regard as shown by the prior art. Bead arrangements to secure a simple hinging action have been used with the flat building drums of the prior art and it will be understood that my invention deals with the flexible portions of the carcass lying above the "hinge".

The broad scope of my invention and the substantial advantages commensurate with the breadth of the invention have been clearly shown above. My broad method and novel former further make available certain particulars of improved tire construction which will now be described, heretofore obtainable in tires of large cross-section only by building them by the core method.

As previously stated, a tire casing is formed of a plurality of plies of cord fabric, the cords of each ply crossing the crown of the tire at an angle to the center line of the tread, the cords of alternate plies being inclined in opposite directions. The plies of cord fabric are cut to the desired width from a web of cord fabric, the strips being cut on the bias and the angle of the cut preferably being related to the angular relation of the cords at the crown of the finished tire in a manner which will be briefly discussed.

In order to secure the desired functioning of the cords in the finished tire it is necessary that they be under a certain degree of tension at the time the rubber which surrounds them is vulcanized, this tension assuring the proper positioning of the cords to withstand the strains incident to tire service. To this end either at the time of building the tire, or subsequent thereto (but prior to vulcanization) or both, the tire fabric is "stretched" a predetermined amount. The degree of stretch imparted may be considered as the increase in area of the fabric ply in the finished tire over its area in an unstretched condition. One element or factor of this stretch is the longitudinal stretch imparted to the fabric at the crown of the carcass of the finished tire; for our present purposes this circumferential stretch is taken as the criterion and is measured as the per cent of increase in the finished crown circumference over the circumference of the unstretched pocket, or length of strip, of the unstretched fabric forming the carcass ply. For given materials and tire construction it is an advantage to have the per cent of circumferential stretch constant for substantially all sizes of tires. That is to say, in building large size tires this stretch should be no more or less than in building small size tires if the material is the same. This per cent of stretch I will call $b$.

Referring to Fig. 5 of the drawings which diagrammatically shows the position of the cords at the crown of a finished tire I have designated as $a$ the angle at which each cord crosses the center line of the tire. Tests have demonstrated that for a given type of tire this angle $a$ should be the same in large size tires as in small size tires. Turning now to Fig. 4 which shows diagrammatically the position of the cords in the unstretched strip of cord fabric as it comes from the bias cutter, I have designated as $c$ the cord angle corresponding to $a$ in the finished tire. Bearing in mind that the tire carcass is made up of a plurality of plies, the cords of which are inclined in opposite directions, it will be seen that the circumferential stretch applied to the tire carcass tends to swing the cords toward the center line of the tire, in other words to get a finish angle $a$ at the crown of the tire after imparting $b$ per cent of stretch we must start with a cord angle $c$. It is a decided advantage from a manufacturing point of view, regardless of the advantage in the finished tire, that $c$ be constant for all sizes of tires since the fabric may then be cut for all sizes of tires with one setting of the bias cutter. This results in substantial savings in handling material under mass production methods.

In Fig. 2 I have diagrammatically illustrated the prior art drum in its relation to the three factors $a$, $b$, and $c$, just discussed, the drum being indicated in sectional profile at 6. The drum has a substantially uniform diameter $f$ which is substantially equal to the bead diameter $d$ of the tire to be built, shoulders being provided to position the beads 7 of the tire carcass 8 in the manner above referred to. At the present time there are seven or more sizes of tires having the same rim diameter, that is, seven on an 18 inch rim, seven on a 19 inch rim, eight on a 20 inch rim, etc. In Fig. 2 I have shown in dotted line two sizes of tires of bead diameter $d$ and outside diameter $e^1$ and $e^2$. The diameter of the pocket or ply of unstretched carcass fabric is designated $h$ and obviously cannot be greater than $f$, the diameter of the drum. It is clear from an inspection of the figure that the circumferential stretch imparted to the fabric in bringing the crown of the tire to the diameter $e^1$ will be less than in bringing it to diameter $e^2$, and that if the cord angle $c$ of the pocket having $h$ diameter is kept constant in building both tires the finish angle $a$ at the crown of the small tire must differ from the finish angle $a$ of the large tire and conversely, if the finish angle $a$ is kept constant the cord angles $c$ must differ.

This illustrates the limitation of the old drum. For a single size tire on the diameter $d$, for instance $e^1$, the stretch from pocket diameter $h$ to finished tire diameter $e^1$ may equal the percentage of stretch $b$ which is called for by desired practice and the desired angle $a$ can be had by properly choosing $c$ it may be that tires differing only slightly in size from $e^1$ may also be built on the drum 6, but it is clear that the value of $b$ will increase as the size of the tire increases (and in large size tires this increase of $b$ attains substantial proportions), since the circumferential stretch that is imparted to the carcass when it is expanded is increased by the increased circumference at $e^2$ over that at $e^1$.

Referring to Fig. 3, I have diagrammatically illustrated how my improved drum permits the building of any size of tire and also permits a control of the values of $a$, $b$, and $c$ to the end that all three may be kept constant regardless of the size of tire built. At 9 I have indicated my drum in profile section with a tire carcass positioned thereon and in dotted line I have indicated two sizes of large tires $e^2$ and $e^3$. Due to the increased diameter $f$ of my drum over that of the drum of Fig. 2, it is possible to increase the pocket diameter $h^1$ to a diameter $h^2$ or $h^3$ such that the stretch $b$ is the same in bringing $h^2$ to diameter $e^3$ or in bringing $h^3$ to diameter $e^3$. It will also be evident that with $b$ constant both $a$ and $c$ can be kept constant. The required value of $h$ for a given size of finished outside tire diameter $e$ may be derived as follows:

$$(1) \quad \begin{aligned} e &= h + bh \\ e &= h(1+b) \\ h &= \frac{e}{1+b} \end{aligned}$$

where $b$ is the constant per cent of stretch desired. It will be noted that when the stretch is kept constant for all the sizes that the value of the cord angle $a$ at the crown of the finished tire may be kept constant and it will follow that the cord angle $c$ of the unstretched fabric will also be constant. It will be noted that while the total stretch imparted to the bands $h^2$ and $h^3$ is constant, with a given value of $f$ a varying portion of the stretch $b$ is applied when the bands $h^2$ or $h^3$ are applied to the support. This portion of the stretch may be designated as $k$ and for any given values of $h$ and $e$ we have the relation:

$$(2) \quad f = h(1+k)$$

$$(3) \quad f = \frac{e(1+k)}{1+b}$$

Obviously when $k$ is equal to 0, $f$ is equal to $h$. The number of sizes of tires which may be built on a given former depends on the value of $k$ permitted by the building conditions imposed by the tire building instrumentalities used, the tire specifications and the extent to which the former may be adjusted for width. The value of $k$ for a given support and given tire size may be derived from (2) and (3):

$$(4) \quad k = \frac{f-h}{h}$$

$$(5) \quad k = \frac{f(1+b)-e}{e}$$

From the above formulæ it is evident that according to my invention a drum may be made for each different size, keeping $a$, $b$, $c$, and $k$ constant, or that within the limits of the mechanical adjustment of the width of the drum and the variation in $k$ permitted by good practice, one drum may be used for several sizes of tires. For example, it has been found that for 28x4.75, 28x4.95, and 29x5.00 on a 19 inch rim a single former of 21.647 inch diameter may be used with constant values for $a$, $b$, and $c$, and $k$ varying between 2.8% and 2.0%. Larger sized tires both on smaller and larger rim diameters have been successfully built according to my invention, examples being 30x6.20 for an 18 inch rim, the crown diameter of the building former being 22.551 inches, and a 32x6.75 for a 20 inch rim, the crown diameter of the building former being 24.532 inches, the values of $a$, $b$, and $c$ being the same in all cases.

It will thus be seen that in addition to making it possible to secure the substantial advantages of flat building methods in the building of large tires, my invention makes possible a nice control of the building factors.

Having thus described my invention, I claim:

1. A tire building former comprising an annular member, bead locating portions adjacent the edges thereof, side portions curving inwardly and upwardly from the bead locating portions a sufficient distance to shape the major portion of the sidewall of the tire and a flat crown portion connecting said curved portions, said flat portion being of less diameter than the final crown diameter of the tire to be built thereon.

2. A tire building former comprising an annular member having a central flat crown portion of less diameter than the final crown diameter of the tire to be built thereon and lying sufficiently above the point where the flexible portions of the carcass join the bead portions of the carcass so that the stretch imparted to the crown portion of a tire built thereon, when the latter is expanded to tire shape, may be controlled by an adjustment in the length of the plies of unstretched carcass material when placed on the building former, the portions of the former underlying the sidewall portion of the tire being curved inwardly and upwardly from the bead supporting portion to the flat crown portion.

3. A tire building former comprising an annular member having a central flat crown portion lying above the point where the flexible portions of the carcass join the bead portions of the carcass, the diameter of the flat crown portion of the former bearing a relation to the outside crown diameter of the tire to be built thereon substantially expressed by the formula $$f=\frac{e(1+k)}{1+b}$$

wherein $f$ equals the diameter of the flat crown portion of the former, $e$ equals the outside crown diameter of the tire to be built, $k$ equals the percentage of circumferential stretch imparted to the carcass material in placing it on the former and $b$ equals the total percentage of circumferential stretch desired to be imparted to the carcass material.

4. A tire building former comprising an annular member, bead locating portions adjacent the edges thereof, inwardly and upwardly inclined curved portions beginning adjacent the bead locating portions and extending a sufficient distance to form the major portions of the sidewall of the tire to approximately tire form, said curved portions terminating in a central flat crown portion, said flat portion being of less diameter than the final crown diameter of the tire to be built thereon.

5. A tire building former comprising an annular member having a central substantially flat crown portion of less diameter than the final crown diameter of the tire to be built thereon and lying above the point where the flexible portions of the carcass join the bead portions of the carcass and inwardly and upwardly inclined curved portions connecting the crown portion and bead portions, said curved portions being of sufficient extent to underlie the major portions of the sidewalls of the tire and shaped to confine substantial angular movement of the cords of the carcass material, incident to subsequently bringing the carcass to tire shape, to the substantially flat crown portion.

6. A tire building former comprising an annular member having a central substantially flat crown portion lying above the point where the flexible portions of the carcass join the bead portions of the carcass and curved portions connecting the crown portion and bead portions, said curved portions being shaped to confine substantial angular movement of the cords of the carcass material, incident to subsequently bringing the carcass to tire shape, to the substantially flat crown portion, the diameter of the flat crown portion of the former bearing a relation to the outside crown diameter of the tire to be built thereon substantially expressed by the formula $$f=\frac{e(1+k)}{1+b}$$

wherein $f$ equals the diameter of the flat crown portion of the former, $e$ equals the outside crown diameter of the tire to be built, $k$ equals the percentage of circumferential stretch imparted to the carcass material in placing it on the former and $b$ equals the total percentage of circumferential stretch desired to be imparted to the carcass material.

GEORGE L. MATHER.